(12) United States Patent
Wang et al.

(10) Patent No.: US 8,949,299 B2
(45) Date of Patent: Feb. 3, 2015

(54) METHOD AND APPARATUS FOR HYBRID RING GENERATOR DESIGN

(75) Inventors: Laung-Terng Wang, Sunnyvale, CA (US); Nur A. Touba, Austin, TX (US)

(73) Assignee: Syntest Technologies, Inc., Sunnyvale, CA (US)

( * ) Notice: Subject to any disclaimer, the term of this patent is extended or adjusted under 35 U.S.C. 154(b) by 566 days.

(21) Appl. No.: 13/195,524

(22) Filed: Aug. 1, 2011

(65) Prior Publication Data

US 2013/0036146 A1 Feb. 7, 2013

(51) Int. Cl.
*G06F 7/58* (2006.01)
(52) U.S. Cl.
CPC .......... *G06F 7/584* (2013.01); *G06F 2207/583* (2013.01)
USPC ........................................................ 708/252
(58) Field of Classification Search
CPC .......... G06F 7/582; G06F 7/584; G06F 7/588
USPC .................. 780/250–256; 708/252
See application file for complete search history.

(56) References Cited

U.S. PATENT DOCUMENTS

| 6,353,842 | B1 | 3/2002 | Rajski et al. | |
|---|---|---|---|---|
| 7,398,287 | B2 * | 7/2008 | An | 708/252 |
| 2007/0294327 | A1 * | 12/2007 | Rajski et al. | 708/252 |

OTHER PUBLICATIONS

Gucwa, Krzysztof, "Analysis of Operation of Ring LFSR Used for Testing of Unidirectional Interleaved Interconnections", Jun. 16-18, 2011. Mixed Design of Integrated Circuits and Systems, 18th International Conference, 479-484.*
L.-T. Wang and E.J. McCluskey, "Hybrid Designs Generating Maximum-Length Sequences," *IEEE Trans. On Computer-Aided Design*, vol. 7, No. 1, pp. 91-99, Jan. 1988.
G. Mrugalski, J. Rajski, and J. Tyszer, "High Speed Ring Generators and Compactors of Test Data," *IEEE VLSI Test Symp.*, pp. 57-62, Apr. 2003.
N. Mukherjee, J. Rajski, G. Mrugalski, A Pogiel, and J. Tyszer, "Ring Generator: An Ultimate Linear Feedback Shift Register," *IEEE Computer*, pp. 64-71, Jun. 2011.

* cited by examiner

*Primary Examiner* — Chuong D Ngo
(74) *Attorney, Agent, or Firm* — Bacon & Thomas, PLLC

(57) ABSTRACT

A method and apparatus for generating a pseudorandom sequence using a hybrid ring generator with low hardware cost. When a primitive polynomial over GF(2) is selected as the characteristic polynomial f(x) to construct a hybrid ring generator, the circuit implementing f(x) will generate a maximum-length sequence (m-sequence). The hybrid ring generator offers unmatched benefits over existing linear feedback shift register (LFSR) based maximum-length sequence generators (MLSGs). Assume k 2-input XOR gates are required in a standard or modular LFSR design. These benefits include requiring only (k+1)/2 2-input XOR gates, having at most one level of a 2-input XOR gate between any pair of flip-flops, enabling the output of each flip-flop to drive at most 2 fanout nodes, and creating a highly regular structure that makes the new design more layout and timing friendly.

16 Claims, 4 Drawing Sheets

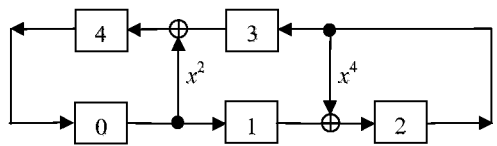
FIG. 6
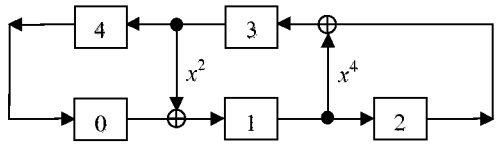
FIG. 7
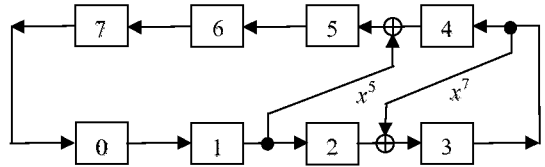
FIG. 8A
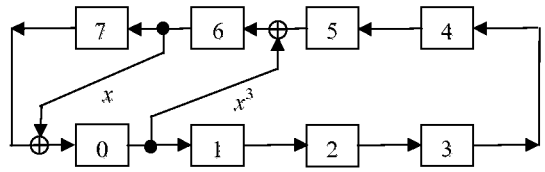
FIG. 8B
|  | 2-Input XOR Gates | Levels of XOR Logic | Fanout |
|---|---|---|---|
| Standard LFSR | $k$ | $\log_2 k$ | 2 |
| Modular LFSR | $k$ | 1 | $k + 1$ |
| Top-Bottom LFSR | $(k + 1) / 2$ | 1 | $(k + 1) / 2$ |
| Bottom-Top LFSR | $(k + 1) / 2$ | 2 | $(k + 1) / 2$ |
| Transformed LFSR | $((k + 1) / 2, k)$ | 1 | $(2, k + 1)$ |
| Ring Generator | $k$ | 1 | 2 |
| Hybrid Ring Generator | $(k + 1) / 2$ | 1 | 2 |
FIG. 9

METHOD AND APPARATUS FOR HYBRID RING GENERATOR DESIGN

FIELD OF THE INVENTION

The present invention generally relates to the field of maximum-length sequence generation. Specifically, the present invention relates to the field of logic built-in self-test, test compression, cryptography, and communications.

BACKGROUND

With rapid advances in semiconductor process technologies and the explosive growth of the consumer electronics market, design of maximum-length sequence generators (MLSGs) to generate binary bit sequences for high-performance applications have drawn attention and reemerged as an important research topic today. These applications range from logic built-in self-test and test compression to cryptography to communications.

Such MLSGs are often realized by maximum-length linear feedback shift registers (LFSRs). These maximum-length LFSRs are typically constructed in a standard or modular form, where one or more XOR gates are interspersed between a flip-flop and the feedback path to generate a desired maximum-length sequence (m-sequence) [1]. If k 2-input XOR gates are required to generate an m-sequence, then the signal on the feedback path would have to propagate through k 2-input XOR gates (as in the standard LFSR) or must be strong enough to drive k+1 fanout nodes (as in the modular LFSR). In either case, the circuit is slowed and may not be applicable for high-performance applications.

To improve the circuit performance (in terms of the number of 2-input XOR gates placed between any two flip-flops and the number of fanout nodes driven by any flip-flop output) and hardware cost (in terms of the total number of 2-input XOR gates required) of these standard and modular LFSRs, many approaches have been proposed. Most noticeable prior art solutions included: 1) hybrid LFSRs that reduce the number of XOR gates from k to (k+1)/2 when the characteristic polynomial generating an m-sequence meets certain requirement [2]; 2) transformed LFSRs that apply a series of transformations to reduce the number of XOR gates and fanout nodes [Rajski patent (2002)]; and 3) ring generators that still use k 2-input XOR gates but can enable each flip-flop output to drive at most 2 fanout nodes and introduce at most one level of one 2-input XOR gate between any two flip-flops [3, 4].

These MLSGs, however, do not offer the combined benefits of using a smaller number of XOR gates and enabling each flip-flop output to drive no more than 2 fanout nodes. In the hybrid LFSR case, while the hardware cost has been reduced for using only (k+1)/2 2-input XOR gates, the rightmost flip-flop would need to pass through one 2-input XOR gate before or after driving (k+1)/2 fanout nodes. Combined with its respective irregularity in design style (due to the long feedback path), this hybrid LFSR may have difficulty to meet frequency requirement for some particular high-performance applications. In the transformed LFSR case, while the number of XOR gates and fanout nodes is reduced, a series of transformations must be performed which could become cumbersome, and the inventors did not teach on how to arrive with using (k+1)/2 2-input XOR gates. In the ring generator case, while the circuit can operate at high speed and result in a simplified layout, its hardware cost is not reduced—it still requires k 2-input XOR gates.

Therefore, there is a need for constructing a new class of high-speed MLSGs referred to as hybrid ring generators that can generate m-sequences or pseudorandom sequences with low hardware cost. When its characteristic polynomial meets certain requirement, the hybrid ring generator will use only (k+1)/2 2-input XOR gates, be able to operate at high speed, and result in a simplified layout. There is also a need for providing a quick visual inspection method and a simple construction method for constructing the hybrid ring generators without going through any transformations.

SUMMARY OF INVENTION

Given a standard or modular LFSR using k 2-input XOR gates, the present invention is to develop a new class of hybrid ring generators that can operate at high speed and each uses only (k+1)/2 2-input XOR gates.

The present invention applies the following formulas to construct hybrid ring generators. A hybrid ring generator may be a top-bottom ring generator or a bottom-top ring generator.

Let $f(x)$ be the characteristic polynomial of degree n over Galois field GF(2) for constructing a hybrid ring generator. Let a polynomial over GF(2), $1+a(x)=b(x)+c(x)$, be said to be fully decomposable iff both $b(x)$ and $c(x)$ have no common terms and there exists an integer j such that $c(x)=x^j b(x)$, where $j \geq 1$. For example, if $1+f(x)$ is fully decomposable such that $$f(x)=1+b(x)+x^j b(x)$$

then a (hybrid) top-bottom ring generator can be constructed using the feedback connection notation $$s(x)=1+\char`\^ x^j+x^j b(x)$$

where $\char`\^ x^j$ indicates that a feedback connection (2-input XOR gate) for the $\char`\^ j$ feedback tap will be connected on the top row, not on the bottom row. Similarly, if $f(x)+x^n$ is fully decomposable such that $$f(x)=b(x)+x^j b(x)+x^n$$

then a (hybrid) bottom-top ring generator can be constructed using the feedback connection notation $$s(x)=b(x)+\char`\^ x^{n-j}+x^n.$$

For example, let $f(x)=1+x^2+x^3+x^4+x^5$. Because $1+f(x)$ is fully decomposable such that $f(x)=1+(x^2+x^3)+x^2(x^2+x^3)$, a feedback connection notation $s(x)=1+\char`\^ x^2+x^2(x^2+x^3)=1+\char`\^ x^2+x^4+x^5$ can be used to construct a top-bottom ring generator as shown in FIG. 6. As another example, $r(x)=1+x+x^2+x^3+x^5$ which is the reciprocal polynomial $r(x)$ of the characteristic polynomial $f(x)$ given above, where $r(x)=x^n f(1/x)$. Because $r(x)+x^5$ is fully decomposable such that $r(x)=(1+x^2)+x(1+x^2)+x^5$, a feedback connection notation $s(x)=(1+x^2)+\char`\^ x^{5-1}+x^5=1+x^2+\char`\^ x^4+x^5$ can be used to realize a bottom-top ring generator as shown in FIG. 7.

One issue that remains to be addressed is where to place the proper feedback connections (such as the $\char`\^ x^2$ and $x^4$ taps in FIG. 6) between the flip-flops which form a ring structure. The present invention further includes a quick visual inspection method and a simple construction method. These methods will become more obvious in the figure descriptions given for FIGS. 8A-B. One important feature of using either method is that construction of these hybrid ring generators would not need to go through a series of transformations.

Note that while the present invention focuses on constructing a hybrid ring generator that implements $f(x)$, which is a primitive polynomial over GF(2), to generate an m-sequence, the method and apparatus presented here is applicable to any hybrid ring generator design that implements a non-primitive polynomial to generate a pseudorandom sequence (not necessarily an m-sequence).

The foregoing and additional objects, features and advantages of the invention will become more apparent from the following detailed description, which proceeds with references to the following drawings.

THE BRIEF DESCRIPTION OF DRAWINGS

Figure 5A:
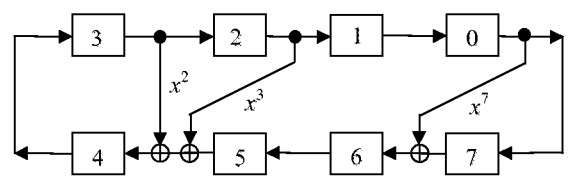
Figure 5B:
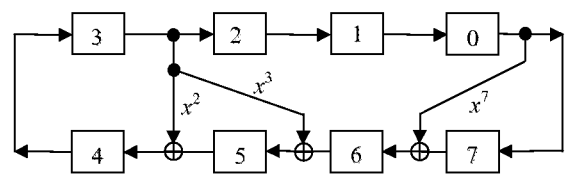
Figure 5C:
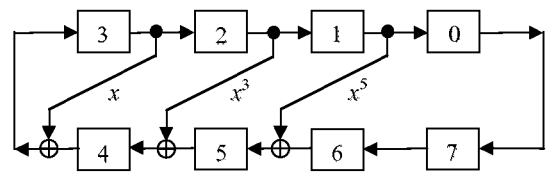

FIGS. 5A-C show 3 prior art 8-stage ring generators to generate an m-sequence;

FIG. 6 shows a 5-stage (hybrid) top-bottom ring generator of a first embodiment of the present invention to generate an m-sequence;

FIG. 7 shows a 5-stage (hybrid) bottom-top ring generator of a second embodiment of the present invention to generate an m-sequence;

FIGS. 8A-B show two 8-stage hybrid ring generators of a third embodiment of the present invention to generate an m-sequence and further how the circuits may be constructed using a visual inspection method or a construction method; and FIG. 9 compares the design features of the hybrid ring generator, in accordance with the present invention, with those of other LFSR-based designs.

DETAILED DESCRIPTION OF THE INVENTION

The following description is presently contemplated as the best mode of carrying out the present invention. This description is not to be taken in a limiting sense but is made merely for the purpose of describing the principles of the invention. The scope of the invention should be determined by referring to the appended claims.

Figure 1A:
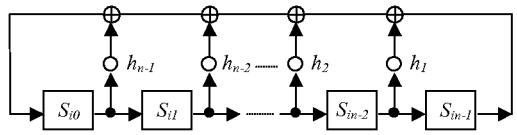
FIG. 1A shows a prior art n-stage standard LFSR to generate an m-sequence.

FIG. 1A shows a prior art n-stage standard LFSR. The circuit consists of n flip-flops (labeled by $S_{i0}$ to $S_{in-1}$) and a number of XOR gates. Since XOR gates are placed on the external feedback path, the standard LFSR is also referred to as an external-XOR LFSR. The internal structure of the n-stage LFSR can be described by specifying a characteristic polynomial of degree n, f(x), in which the symbol $h_i$ is either 1 or 0, depending on the existence or absence of the feedback path, where $f(x)=1+h_1 x+h_2 x^2+\ldots+h_{n-1}x^{n-1}+x^n$.

If T is the smallest positive integer such that f(x) divides $1+x^T$, then the integer T is called the period of the LFSR. If $T=2^n-1$, then the n-stage LFSR generating the maximum-length sequence or m-sequence is called a maximum-length LFSR and thus can serve as an MLSG. If f(x) contains k+2 terms (a.k.a. coefficients, weights, exponents), then the n-stage standard LFSR will contain k 2-input XOR gates on the feedback path, where k is always an odd number. If k is a large number, then the circuit may not operate fast enough for high-performance applications.

Define a primitive polynomial of degree n over GF(2), p(x), as a polynomial that divides $1+x^T$, but not $1+x^i$, for any integer i<T, where $T=2^n-1$. A primitive polynomial is irreducible. When a primitive polynomial p(x) is used as f(x), the standard LFSR implementing f(x) will be able to generate an m-sequence.

Figure 1B:
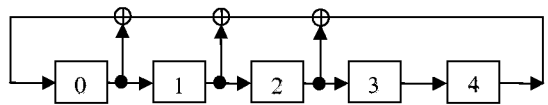
FIG. 1B shows a prior art 5-stage standard LFSR to generate an m-sequence.

FIG. 1B shows a prior art 5-stage standard LFSR with $f(x)=1+x^2+x^3+x^4+x^5$. The circuit consists of 5 flip-flops (labeled by 0 to 4) and 3 2-input XOR gates. Since f(x) contains 5 terms, the circuit uses a total of 3 2-input XOR gates. Since f(x) is a primitive polynomial, it will generate an m-sequence with period 31. The output signal at flip-flop 4 needs to propagate through 3 XOR gates to reach flip-flop 0.

Figure 2A:
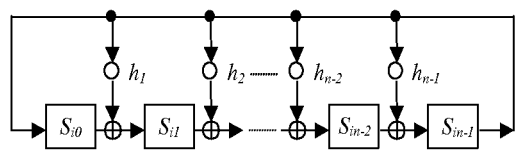
FIG. 2A shows a prior art n-stage modular LFSR to generate an m-sequence.

FIG. 2A shows a prior art n-stage modular LFSR. The circuit consists of n flip-flops (labeled by $S_{i0}$ to $S_{in-1}$) and a number of XOR gates. Since XOR gates are placed on the internal feedback path, the modular LFSR is also referred to as an internal-XOR LFSR. The modular LFSR when so constructed will implement the same f(x) as the standard LFSR given in FIG. 1A. If f(x) contains k+2 terms, then the n-stage modular LFSR will contain k 2-input XOR gates interspersed between flip-flops, where k is always an odd number. Also, when a primitive polynomial p(x) is used as f(x), the modular LFSR implementing f(x) will be able to generate an m-sequence. Since the output of the rightmost flip-flop needs to drive k+1 fanout nodes on the feedback path, if k is a large number, then the circuit may not operate fast enough for high-performance applications.

Figure 2B:
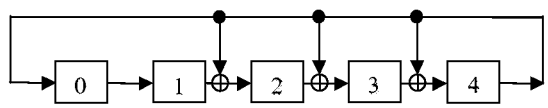
FIG. 2B shows a prior art 5-stage modular LFSR to generate an m-sequence.

FIG. 2B shows a prior art 5-stage modular LFSR with $f(x)=1+x^2+x^3+x^4+x^5$. The circuit consists of 5 flip-flops (labeled by 0 to 4) and 3 2-input XOR gates. Since f(x) contains 5 terms, the circuit uses a total of 3 2-input XOR gates. Since f(x) is a primitive polynomial, it will generate an m-sequence with period 31. The output signal at flip-flop 4 drives 4 fanout nodes on the feedback path.

Figure 3A:
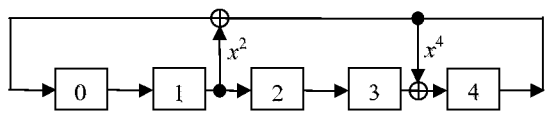
FIG. 3A shows a prior art 5-stage (hybrid) top-bottom LFSR to generate an m-sequence.

FIG. 3A shows a prior art 5-stage top-bottom LFSR [2]. A top-bottom LFSR is a hybrid LFSR. The circuit implements the same f(x), $1+x^2+x^3+x^4+x^5$, as those for FIGS. 1B and 2B. According to [2], if 1+f(x) is fully decomposable such that $f(x)=1+(x^2+x^3)+x^2(x^2+x^3)$, then a feedback connection notation $s(x)=1+\hat{}x^2+x^2(x^2+x^3)=1+\hat{}x^2+x^4+x^5$ can be used to construct the top-bottom LFSR where $\hat{}x^2$ indicates that the XOR gate with one input taken from the second stage output of the LFSR (flip-flop 1) is connected on the top row, not on the bottom row. The $\hat{}x^2$ feedback tap is now connected on the top row, while the $x^4$ feedback tap is connected on the bottom row. Since f(x) is a primitive polynomial, the top-bottom LFSR will generate an m-sequence. As can be seen, this top-bottom LFSR uses only 2 XOR gates—a reduction of one XOR gate compared to the circuit given in FIG. 1B or 2B. It was further shown in [2] that if 1+f(x) is fully decomposable, then the top-bottom LFSR implementing the f(x) will use only (k+1)/2 2-input XOR gates, as opposed to k 2-input XOR gates required in a corresponding standard or modular LFSR. Note that in the top-bottom LFSR design, all flip-flops are typically placed on the bottom row. While it is possible to form a ring structure by placing one or more flip-flops on the top row, the design will not be as regular or modular as a hybrid ring generator shown in FIGS. 6 and 7.

Figure 3B:
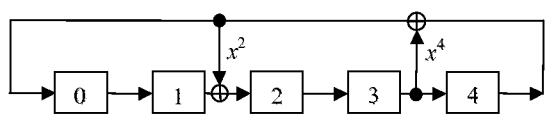
FIG. 3B shows a prior art 5-stage (hybrid) bottom-top LFSR to generate an m-sequence

FIG. 3B shows a prior art 5-stage bottom-top LFSR [2] that implements the reciprocal polynomial, $r(x)=x^n f(1/x)$ or $1+x+x^2+x^3+x^5$, of the primitive polynomial for FIG. 3A. A bottom-top LFSR is also a hybrid LFSR. According to [2], if $f(x)+x^5$ is fully decomposable such that $f(x)=(1+x^2)+x(1+x^2)+x^5$, then a feedback connection notation $s(x)=(1+x^2)+\hat{}x^{5-1}+x^5=1+x^2+\hat{}x^4+x^5$ can be used to construct the bottom-top LFSR, where $\hat{}x^4$ indicates that the XOR gate with one input taken from the fourth stage output of the LFSR (flip-flop 3) is connected on the top row, not on the bottom row. The $x^2$ feedback tap is now connected on the bottom row, while the ^$x^4$ feedback tap is connected on the top row. Since a reciprocal polynomial of a primitive polynomial is a primitive polynomial, the bottom-top LFSR will also generate an m-sequence. As can be seen, this bottom-top LFSR uses only 2 XOR gates—a reduction of one XOR gate compared to the circuit given in FIG. 1B or 2B. It was further shown in [2] that if $f(x)+x^n$ is fully decomposable, then the bottom-top LFSR implementing the f(x) will use only (k+1)/2 2-input XOR gates, as opposed to k 2-input XOR gates required in a corresponding standard or modular LFSR. Note that in the bottom-top LFSR design, all flip-flops are typically placed on the bottom row. While it is possible to form a ring structure by placing one or more flip-flops on the top row, the design will not be as regular or modular as the hybrid ring generator shown in FIGS. 6 and 7.

Figure 4A:
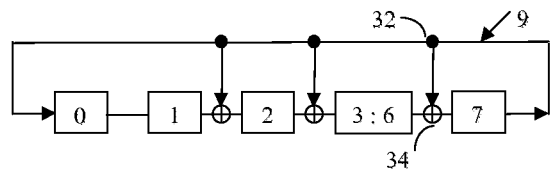
FIGS. 4A-D show a prior art 8-stage transformed LFSR to generate an m-sequence.
Figure 4B:
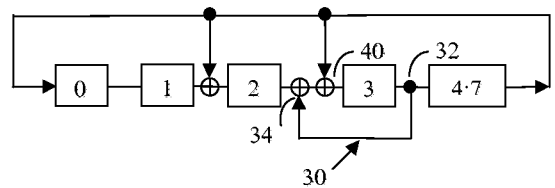
Figure 4C:
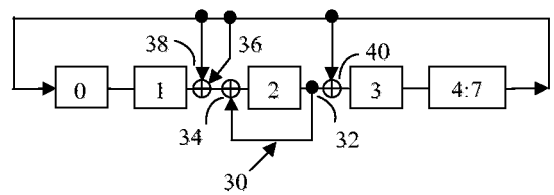
Figure 4D:
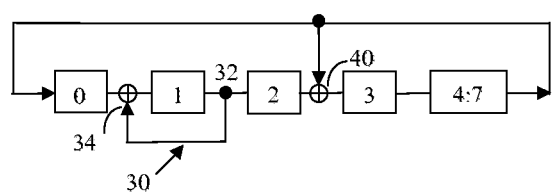

FIGS. 4A-D show a prior art example using an 8-stage transformed LFSR (t-LFSR) to generate an m-sequence [Rajski patent (2002)]. FIG. 4A shows a modular LFSR implementing $f(x)=p(x)=1+x^2+x^3+x^7+x^8$. The circuit consists of 8 flip-flops (labeled by 0 to 7) and 3 2-input XOR gates. First, an elementary shift left (EL) transformation as described in the Rajski patent (2002) is applied 4 times to the feedback connection represented by coefficient $x^7$ (feedback connection 9 with source tap 32 and destination gate 34). This leads to the circuit shown in FIG. 4B. Next, a source tap crossing a destination tap while moving to the left (SDL) transformation as described in the Rajski patent (2002) is applied to shift the feedback connection further to the left by one flip-flop and adds a feedback connection line 36 at the input to the XOR gate 34 as shown in FIG. 4C. Because another XOR gate 38 with the same connectivity already exists at the output of flip-flop 1, the XOR gate 34 and connection 36 can be discarded. This reduces the number of XOR gates in the LFSR from 3 to 2. To reduce the load of flip-flop 2 that drives XOR gates 40 and 34 in FIG. 4C, an additional transformation EL is applied in FIG. 4D that shifts the feedback connection 30 further to the left. As a result, the transformed LFSR uses only 2 XOR gates and every flip-flop output drives at most two fanout nodes. As f(x) is a primitive polynomial and these transformations can preserve the m-sequence property, the resulting t-LFSR can generate an m-sequence, although state trajectory is different. This prior art shows by examples that applying transformations to a standard or modular circuit can potentially lead to reductions in the number of XOR gates and the number of fanout nodes. Construction of the transformed LFSR, however, needs to go through a series of transformations.

FIGS. 5A-B show two prior art 8-stage ring generator designs using the synthesis method given in [3] to implement $f(x)=p(x)=1+x^2+x^3+x^7+x^8$. Either ring generator is formed in a ring structure (labeled by 0 to 7) and includes 3 2-input XOR gates. A ring generator in so constructed will exhibit the following properties: 1) Every output of a flip-flop will drive at most 2 fanout nodes; 2) There will be at most one 2-input XOR gate placed between any two flip-flops, and thus each output signal of any flip-flop will only have to propagate through at most one 2-input XOR gate; 3) There will be no long feedback path, as the circuit is implemented in a ring structure; and 4) Its regular and modular structure will result in simplified layout and routing, making the circuit timing and layout friendly. The number of 2-input XOR gates required to construct the ring generator is k, which is the same as its corresponding standard or modular LFSR. However, if f(x) contains consecutive terms (other than 1+x and $x^{n-1}+x^n$), then the level of XOR logic or fanout count will have to be increased by one. FIG. 5C shows another prior art circuit where the ring generator implements a primitive polynomial of degree 8 using $1+x+x^3+x^5+x^8$ that does not contain consecutive terms. In this case, the circuit will preserve all four properties mentioned above. Since a primitive polynomial is used, each ring generator given in FIGS. 5A-C can generate an m-sequence.

FIG. 6 shows a first embodiment of a 5-stage top-bottom ring generator, in accordance with the present invention. The circuit consists of 5 flip-flops (labeled by 0 to 4) and 2 2-input XOR gates (with the ^$x^2$ tap connected on the top row and the $x^4$ tap connected on the bottom row). As can be seen, every pair of adjacent flip-flops contains at most one 2-input XOR gate and each flip-flop output drives at most 2 fanout nodes. Similar to the ring generator, the circuit is constructed in a ring structure so there is no long feedback path connecting the rightmost flip-flop to the leftmost flip-flop. Since the XOR gates are placed on the top and bottom rows simultaneously, a ring generator constructed with this additional property is referred to as a hybrid ring generator. Also, if the first XOR gate connecting to the leftmost stages is placed on the top row, then the hybrid ring generator is referred to as a (hybrid) top-bottom ring generator (see FIG. 6). Similarly, if the first XOR gate connecting to the rightmost stages is placed on the bottom row, then the hybrid ring generator is referred to as a (hybrid) bottom-top ring generator (see FIG. 7). Note that in each top-bottom or bottom-top ring generator, there will be one and only one 2-input XOR gate connected on the top row.

This top-bottom ring generator is constructed based on the observation that given f(x), if 1+f(x) is fully decomposable, then the top-bottom ring generator will use (k+1)/2 2-input XOR gates and preserve all four ring generator properties.

Let $X=\{x_0 \ldots x_4\}$ and $Z=\{z_0 \ldots z_4\}$ represent the circuit's present state and next state, respectively. Linear equations over GF(2) governing the operation of the circuit can be expressed as follows:

$$z_0 = x_4$$

$$z_1 = x_0$$

$$z_2 = x_1 + x_2$$

$$z_3 = x_2$$

$$z_4 = x_0 + x_3$$

The set of linear equations can be further described by:

$$Z = M * X$$

or $$\begin{bmatrix} z_0 \\ z_1 \\ z_2 \\ z_3 \\ z_4 \end{bmatrix} = \begin{bmatrix} 0 & 0 & 0 & 0 & 1 \\ 1 & 0 & 0 & 0 & 0 \\ 0 & 1 & 1 & 0 & 0 \\ 0 & 0 & 1 & 0 & 0 \\ 1 & 0 & 0 & 1 & 0 \end{bmatrix} \begin{bmatrix} x_0 \\ x_1 \\ x_2 \\ x_3 \\ x_4 \end{bmatrix}$$

where matrix M is simply a companion matrix [1] whose characteristic polynomial f(x) is defined as the determinant of M−Ix, or symbolically:

$$f(x) = |M - Ix|.$$

Then, the equation can be rewritten as:

$$f(x) = \begin{vmatrix} x & 0 & 0 & 0 & 1 \\ 1 & x & 0 & 0 & 0 \\ 0 & 1 & 1+x & 0 & 0 \\ 0 & 0 & 1 & x & 0 \\ 1 & 0 & 0 & 1 & x \end{vmatrix}$$

This yields $f(x)=1+x^2+x^3+x^4+x^5$, which is the same primitive polynomial used to construct the three circuits shown in FIGS. 1B, 2B, and 3A. Hence, this top-bottom ring generator can generate an m-sequence. Because $1+f(x)$ is fully decomposable such that $f(x)=1+(x^2+x^3)+x^2(x^2+x^3)$, a feedback connection notation $s(x)=1+\hat{x}^2+x^2(x^2+x^3)=1+x^2+x^4+x^5$ can be used to construct the top-bottom ring generator as shown in FIG. 6.

FIG. 7 shows a second embodiment of a 5-stage bottom-top ring generator, in accordance with the present invention. The characteristic polynomial, $1+x+x^2+x^3+x^5$, chosen to construct the hybrid circuit is the same reciprocal polynomial used to realize the bottom-top LFSR shown in FIG. 3B. The circuit consists of 5 flip-flops (labeled by 0 to 4) and 2 2-input XOR gates (with the $x^2$ tap connected on the bottom row and the $\hat{x}^4$ tap connected on the top row). As can be seen, every pair of adjacent flip-flops contains at most one 2-input XOR gate and each flip-flop output drives at most 2 fanout nodes.

This bottom-top ring generator is constructed based on the observation that given $f(x)$, if $f(x)+x^n$ is fully decomposable, then the bottom-top ring generator will use $(k+1)/2$ 2-input XOR gates and preserve all four ring generator properties.

Looking into FIG. 7, the operation of the circuit relating next state Z to present state X can be expressed as:

$$\begin{bmatrix} z_0 \\ z_1 \\ z_2 \\ z_3 \\ z_4 \end{bmatrix} = \begin{bmatrix} 0 & 0 & 0 & 0 & 1 \\ 1 & 0 & 0 & 1 & 0 \\ 0 & 1 & 0 & 0 & 0 \\ 0 & 1 & 1 & 0 & 0 \\ 0 & 0 & 0 & 1 & 0 \end{bmatrix} \begin{bmatrix} x_0 \\ x_1 \\ x_2 \\ x_3 \\ x_4 \end{bmatrix}$$

Then, by $f(x)=|M-Ix|$, $f(x)$ can be rewritten as:

$$f(x) = \begin{vmatrix} x & 0 & 0 & 0 & 1 \\ 1 & x & 0 & 1 & 0 \\ 0 & 1 & x & 0 & 0 \\ 0 & 1 & 1 & x & 0 \\ 0 & 0 & 0 & 1 & x \end{vmatrix}$$

This yields $f(x)=1+x+x^2+x^3+x^5$, which is the primitive polynomial used to construct the bottom-top LFSR given in FIG. 3B. Hence, the top-bottom ring generator can generate an m-sequence. Because $f(x)+x^5$ is fully decomposable such that $f(x)=(1+x^2)+x(1+x^2)+x^5$, a feedback connection notation $s(x)=(1+x^2)+x^{5-1}+x^5=1+x^2+\hat{x}^4+x^5$ can be used to realize the bottom-top ring generator as shown in FIG. 7.

FIGS. 8A-B show two 8-stage hybrid ring generators of a third embodiment of the present invention to generate an m-sequence. The purpose is to further demonstrate how a hybrid ring generator can be designed via a quick visual inspection method or by a simple construction method, without going through a series of transformations. The 8-stage top-bottom ring generator illustrated in FIG. 8A implements $f(x)=p(x)=1+x^2+x^3+x^7+x^8$. The 8-stage bottom-top ring generator illustrated in FIG. 8B implements $r(x)=1+x+x^5+x^6+x^8$, which is the reciprocal polynomial $r(x)$ of the primitive polynomial $p(x)$. Each hybrid ring generator consists of 8 flip-flops (labeled by 0 to 7) connected counterclockwise. In FIG. 8A, because $f(x)=1+(x^2+x^3)+x^5(x^2+x^3)$, this means $s(x)=1+\hat{x}^5+x^7+x^8$. Hence, the $\hat{x}^5$ feedback tap is connected on the top row, while the $x^7$ feedback tap is connected on the bottom row. In FIG. 8B, because $r(x)=(1+x)+x^5(1+x)+x^8$, this means $s(x)=1+x+\hat{x}^{8-5}+x^8=1+x+\hat{x}^3+x^8$. Hence, the x feedback tap is connected on the bottom row, while the $\hat{x}^3$ feedback tap is connected on the top row.

In the present invention, one may place the feedback taps in the hybrid ring generator according to the following visual inspection method: 1) select a primitive polynomial of degree n as the characteristic polynomial $f(x)$ such that it can result in a feedback connection notation $s(x)$; 2) place at least one flip-flop on the top row and the rest of the flip-flops on the bottom row and then stitch them together to form a ring structure; 3) label the flip-flop numbers from 0 to n−1 counterclockwise starting with the leftmost bottom flip-flop in the hybrid ring generator design; 4) for a given tap $x^i$ in $s(x)$, where $0<i<n$, create a feedback connection and place one 2-input XOR gate on the bottom row by encompassing i adjacent flip-flops, always beginning with the leftmost ones; and 5) for a given tap $\hat{x}^j$ in $s(x)$, where $0<j<n$, create a feedback connection and place another 2-input XOR gate on the top row, by encompassing j adjacent flip-flops, always beginning with the leftmost ones.

One may also place the feedback taps in the hybrid ring generator according to the following construction method:

Step 1: Let $T_i$ represent the span (coefficient c) of the ith tap ($x^c$); $S_i$ and $D_i$ indicate the locations of the source and destination taps (as inputs to a 2-input XOR gate) in the resultant hybrid ring generator, respectively; and L be the number of flip-flops in a hybrid LFSR. If L is an odd number, let $L=L+1$; next, label 0 to L−1 on each flip-flop counterclockwise, starting with an entry 0 on the leftmost bottom flip-flop; then, calculate locations of the source and destination taps according to the following formulas:

$$S_i = (L-T_i)/2 + L/2 - 1$$

$$D_i = (S_i + T_i) \bmod L.$$

Consider FIG. 8A again. L=8. The two $\hat{x}^5$ and $x^7$ taps in $s(x)=1+\hat{x}^5+x^7+x^8$ is represented by a sequence $T_1=5$, $T_2=7$ (entries 0 and 8 do not have to be processed as they are not subject to transformations). Thus, using the above formulas will yield the following feedback connections: $S_1=(8-5)/2+8/2-1=4$, $D_1=(4+5) \bmod 8=1$; $S_2=(8-7)/2+8/2-1=3$, $D_2=(3+7) \bmod 8=2$. The two taps can be expressed as a list of pairs: (4,1), (3,2).

Step 2: Reverse the direction of the leftmost (or rightmost) tap to create the $\hat{x}^c$ tap on the top row for a top-bottom (or bottom-top) ring generator.

Step 3: (Required only when the circuit has an odd number of stages) Delete the entry L/2 from the label and decrement all entries on the top row by 1.

For example, FIG. 6 has 5 flip-flops. The circuit will be first labeled with {0, 1, 2, 3, 4, 5} for L=6 (not 5). Then, delete the entry 3 and renumber the rest to {0, 1, 2, 3, 4}.

Note that while all examples illustrated in the present invention labeled the flip-flops counterclockwise starting with the leftmost bottom flip-flop in the hybrid ring generator design, one may label the flip-flops in a select order starting with any selected flip-flop as long as proper formulas are given to calculate the locations of the source and destination taps for each feedback tap in s(x).

FIG. 9 compares the design features of the hybrid ring generator, in accordance with the present invention, with those of other LFSR-based MLSG designs. Each standard or modular LFSR will use k 2-input XOR gates. The standard LFSR will have a propagation delay equivalent to $\log_2 k$ (not k) levels of XOR logic on the feedback path, since the feedback logic can be implemented as a balanced XOR tree. On the other hand, the output of the rightmost flip-flop in the modular LFSR will drive k+1 fanout nodes. The top-bottom (or bottom-top) LFSR will have one level (or two levels) of XOR logic because it is constructed to have only one 2-input XOR gate connected to the feedback path. On the other hand, the feedback path in each top-bottom or bottom-top LFSR will always drive (k+1)/2 fanout nodes due to the nature of the design. The transformed LFSR (t-LFSR) solely relies on transformations to reduce the number of XOR logic and the number of fanout nodes with respect to its corresponding standard or modular LFSR. As the standard or modular LFSR may not implement a primitive polynomial that meets the fully decomposable requirement, the number of 2-input XOR gates used in the transformed LFSR would be between (k+1)/2 and k. Similar argument applies to the number of fanout nodes (the Fanout column) driven by each flip-flop output. One additional difference between a transformed LFSR and a hybrid ring generator is that the hybrid design approach in the present invention does not need to go through any transformations once a proper primitive polynomial is found.

Note that the Level of XOR Logic and Fanout columns given in the ring generator row assume that the chosen primitive polynomial as f(x) to design the ring generator does not contain consecutive terms. If one selects a primitive polynomial that contains consecutive terms, then the Level of XOR Logic or Fanout would have to be increased by one. Similar assumption also applies to hybrid ring generator design: the chosen primitive polynomial must be the one such that its corresponding feedback connection notation, s(x), does not contain consecutive terms.

The hybrid ring generator in the present invention will now be able to match or outperform all other LFSR-based MLSG designs with the lowest hardware cost.

Having thus described and illustrated specific embodiments of the present invention, it is to be understood that the objectives of the invention have been fully achieved. And it will be understood by those skilled in the art that many changes in construction and circuitry, and widely differing embodiments and applications of the invention will suggest themselves without departing from the spirit and scope of the present invention. The disclosures and the description herein are intended to be illustrative and are not in any sense limitation of the invention, more preferably defined in scope by the following claims.

What is claimed is:

1. An apparatus using an n-stage hybrid ring generator to generate a pseudorandom sequence, the hybrid ring generator implementing a characteristic polynomial f(x) of degree n over GF(2) that contains k+2 terms, where 0<k<n, said characteristic polynomial f(x) being chosen such that 1+f(x) or f(x)+$x^n$ is fully decomposable to obtain a feedback connection notation s(x), wherein said s(x) is used to construct said hybrid ring generator, said apparatus comprising:
   (a) n flip-flops connected to each other in a given order to form a ring structure with at least one said flip-flop placed on a top row and the rest of said n flip-flops placed on a bottom row; and
   (b) (k+1)/2 2-input XOR gates each placed between a select pair of said n flip-flops such that at least one said XOR gate is connected on said top row, wherein said hybrid ring generator has at most one level of XOR logic between every pair of said n flip-flops and each said flip-flop output in said hybrid ring generator drives no more than 2 fanout nodes.

2. The apparatus of claim 1, wherein said pseudorandom sequence is a maximum-length sequence (m-sequence), when said characteristic polynomial f(x) is a primitive polynomial of degree n over GF(2).

3. The apparatus of claim 1, wherein said pseudorandom sequence is not a maximum-length sequence (m-sequence), when said characteristic polynomial f(x) is not a primitive polynomial of degree n over GF(2).

4. The apparatus of claim 1, wherein said n flip-flops connected to each other in a given order to form a ring structure further comprises labeling said flip-flop numbers from 0 to n−1 counterclockwise starting with the leftmost bottom flip-flop in said hybrid ring generator design.

5. The apparatus of claim 1, wherein said s(x) is used to construct said hybrid ring generator further comprises creating a feedback connection for a select tap $x^i$ in said s(x), where 0<i<n, and placing one said XOR gate on said bottom row by encompassing i adjacent flip-flops, always beginning with the leftmost ones.

6. The apparatus of claim 1, wherein said s(x) is used to construct said hybrid ring generator further comprises creating a feedback connection for a select tap $\hat{x}^j$ in said s(x), where 0<j<n, and placing one said XOR gate on said top row by encompassing j adjacent flip-flops, always beginning with the leftmost ones.

7. The apparatus of claim 1, said s(x) is used to construct said hybrid ring generator further comprises calculating the positions of the source and destination taps for a select tap $x^i$ in said s(x), where 0<i<n, and placing one said XOR gate on said bottom row according to said positions.

8. The apparatus of claim 1, said s(x) is used to construct said hybrid ring generator further comprises calculating the positions of the source and destination taps for a select tap $\hat{x}^j$ in said s(x), where 0<j<n, and placing one said XOR gate on said top row according to said positions.

9. A method for realizing an n-stage hybrid ring generator to generate a pseudorandom sequence, the hybrid ring generator implementing a characteristic polynomial f(x) of degree n over GF(2) that contains k+2 terms, where 0<k<n, said characteristic polynomial f(x) being chosen such that 1+f(x) or f(x)+$x^n$ is fully decomposable to obtain a feedback connection notation s(x), wherein said s(x) is used to construct said hybrid ring generator, said method comprising:
   (a) selecting said characteristic polynomial f(x) such that it can result in said feedback connection notation s(x) to construct said hybrid ring generator;
   (b) connecting n flip-flops to each other in a select order to form a ring structure with at least one said flip-flop placed on a top row and the rest of said n flip-flops placed on a bottom row; and
   (c) placing (k+1)/2 2-input XOR gates each between a select pair of said n flip-flops in accordance with said s(x) such that at least one said XOR gate is connected on said top row, wherein said hybrid ring generator has at most one level of XOR logic between every pair of said n flip-flops and each said flip-flop output in said hybrid ring generator drives no more than 2 fanout nodes.

10. The method of claim 9, wherein said pseudorandom sequence is a maximum-length sequence (m-sequence), when said characteristic polynomial f(x) is a primitive polynomial of degree n over GF(2).

11. The method of claim 9, wherein said pseudorandom sequence is not a maximum-length sequence (m-sequence), when said characteristic polynomial f(x) is not a primitive polynomial of degree n over GF(2).

12. The method of claim 9, wherein said connecting n flip-flops to each other in a select order to form a ring structure further comprises labeling said flip-flop numbers from 0 to n−1 counterclockwise starting with the leftmost bottom flip-flop in said hybrid ring generator design.

13. The method of claim 9, wherein said placing (k+1)/2 2-input XOR gates each between a select pair of said n flip-flops in accordance with said s(x) further comprises creating a feedback connection for a select tap $x^i$ in said s(x), where 0<i<n, and placing one said XOR gate on said bottom row by encompassing i adjacent flip-flops, always beginning with the leftmost ones.

14. The method of claim 9, wherein said placing (k+1)/2 2-input XOR gates each between a select pair of said n flip-flops in accordance with said s(x) further comprises creating a feedback connection for a select tap $\hat{x}^j$ in said s(x), where 0<j<n, and placing one said XOR gate on said top row by encompassing j adjacent flip-flops, always beginning with the leftmost ones.

15. The method of claim 9, wherein said placing (k+1)/2 2-input XOR gates each between a select pair of said n flip-flops in accordance with said s(x) further comprises calculating the positions of the source and destination taps for a select tap $x^i$ in said s(x), where 0<i<n, and placing one said XOR gate on said bottom row according to said positions.

16. The method of claim 9, wherein said placing (k+1)/2 2-input XOR gates each between a select pair of said n flip-flops in accordance with said s(x) further comprises calculating the positions of the source and destination taps for a select tap $\hat{x}^j$ in said s(x), where 0<j<n, and placing one said XOR gate on said top row according to said positions.

\* \* \* \* \*